April 28, 1970     A. W. JOYCE     3,508,289
APPARATUS FOR MAKING FOOTWEAR
Filed June 2, 1969     4 Sheets-Sheet 2

INVENTOR.
ARTHUR W. JOYCE
BY Joseph Januszkiewicz
ATTY.

INVENTOR.
ARTHUR W. JOYCE
BY Joseph Januszkiewicz
ATTY.

April 28, 1970 A. W. JOYCE 3,508,289
APPARATUS FOR MAKING FOOTWEAR
Filed June 2, 1969 4 Sheets-Sheet 4
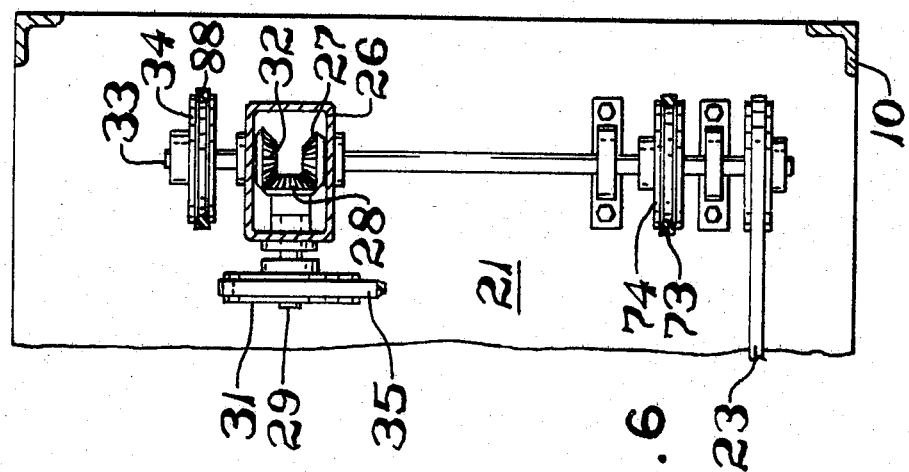
FIG. 7
FIG. 6
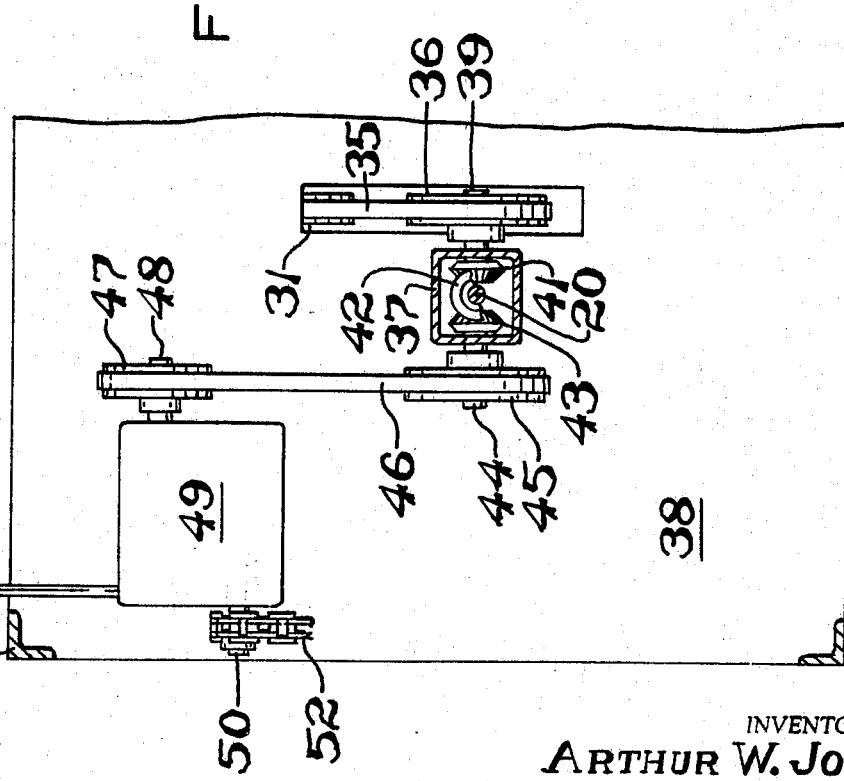
INVENTOR.
ARTHUR W. JOYCE
BY Joseph Januszkiewicz
ATTY.

United States Patent Office 3,508,289
Patented Apr. 28, 1970

3,508,289
APPARATUS FOR MAKING FOOTWEAR
Arthur W. Joyce, Framingham, Mass., assignor to The B. F. Goodrich Company, New York, N.Y., a corporation of New York
Filed June 2, 1969, Ser. No. 829,601
Int. Cl. A43d 25/00
U.S. Cl. 12—17   10 Claims

ABSTRACT OF THE DISCLOSURE

A footwear buffing apparatus for buffing upper and peripheral surfaces of molded outsoles wherein such apparatus has circular upper brushing means for scuffing the upper surface of the outsole and a circular buffing stone for scuffing the peripheral surfaces of the outsole, which components further cooperate with a lower drive roll which moves the entire outsole through a continuous buffing operation.

BACKGROUND OF THE INVENTION

This invention relates to an apparatus for making footwear and, more particularly, to an apparatus for automatically buffing the entire upper and peripheral surfaces of a molded footwear outsole.

In manufacturing fabric footwear, a rubber or plastic outsole is customarily adhered to a fabric upper with a foxing strip adhered to the peripheral surface of the molded outsole such that the foxing strip also covers the lower marginal portion of the fabric upper so as to provide a neat outer appearance of the footwear product. On the inside of the footwear an insole in normally adhered to the top surface of the molded outsole. The molded outsole, the insole, the fabric-upper and foxing strip are thereafter molded together under pressure providing intimate contact and setting of the adhesive bonds, thus producing an integral finished footwear product. To obtain proper adhesive bonding of various footwear components to molded outsoles, it is customary to buff the smooth surfaces prior to applying the adhesive to the outsole. It is difficult to get good adhesion to an outsole if such outsole is insufficient, poorly or non-uniformly buffed which yields footwear products of inadequate strengths and poor durability. A properly buffed or scuffed outsole, however, provides necessary surface roughness required to obtain satisfactory adhesive bonding to the outsole. The buffing operation, therefore, is an important manufacturing step in the fabrication of footwear products.

Many attempts have been made to improve the quality of this important manufacturing operation which to this time have been primarily manual operations. Manual operations are tedious and time consuming requiring an unreasonable amount of manufacturing time. Manual operations are notoriously unreliable due to operator fatigue and inconsistent skill of the operator. Poorly buffed outsoles cause premature structural failures in footwear products often producing an inproportionate number of rejects. Disadvantages heretofore experienced with manual buffing are no longer encountered with this invention.

The advantages realized by utilizing the buffing apparatus are numerous. Automatic buffing removes material rapidly and uniformly so as to consistenly produce properly buffed outsoles. The interaction of the various components of this apparatus cause molded outsoles to rotate in a quasi-circular pattern enabling the upper and peripheral surfaces of the molded outsole to be buffed in a single continuous manufacturing operation. A manufacturing operation dependent upon operator's skill is eliminated, and operator fatigue no longer affects the quality of the finished footwear product. Adhesive bonding to the outsole is uniformly tenacious and thereby produces a consistently high quality footwear product.

SUMMARY OF THE INVENTION

The buffing apparatus comprises a plurality of rotating buffing means suitably disposed for scuffing the upper and peripheral surfaces of the outsole rapidly and uniformly, wherein the outsole is supported by a rotatable drive means which drives the outsole in a horizontal quasi-circular pattern. A rotating buffer stone is located adjacent the peripheral surface of the outsole and rotatable brushing means is disposed above the upper surface of the outsoles which rotate in coordination with the drive means to achieve a properly scuffed outsole.

To clearly illustrate this invention, reference will henceforth be made to the embodiment of this invention shown in the drawings.

BRIEF DESCRIPTION OF THE DRAWINGS

FIG. 6 is a plan view of the buffing apparatus taken along line 6—6 of FIG. 1;

FIG. 7 is a plan view of the buffing apparatus taken along line 7—7 of FIG. 1.

DETAILED DESCRIPTION

Figure 1:
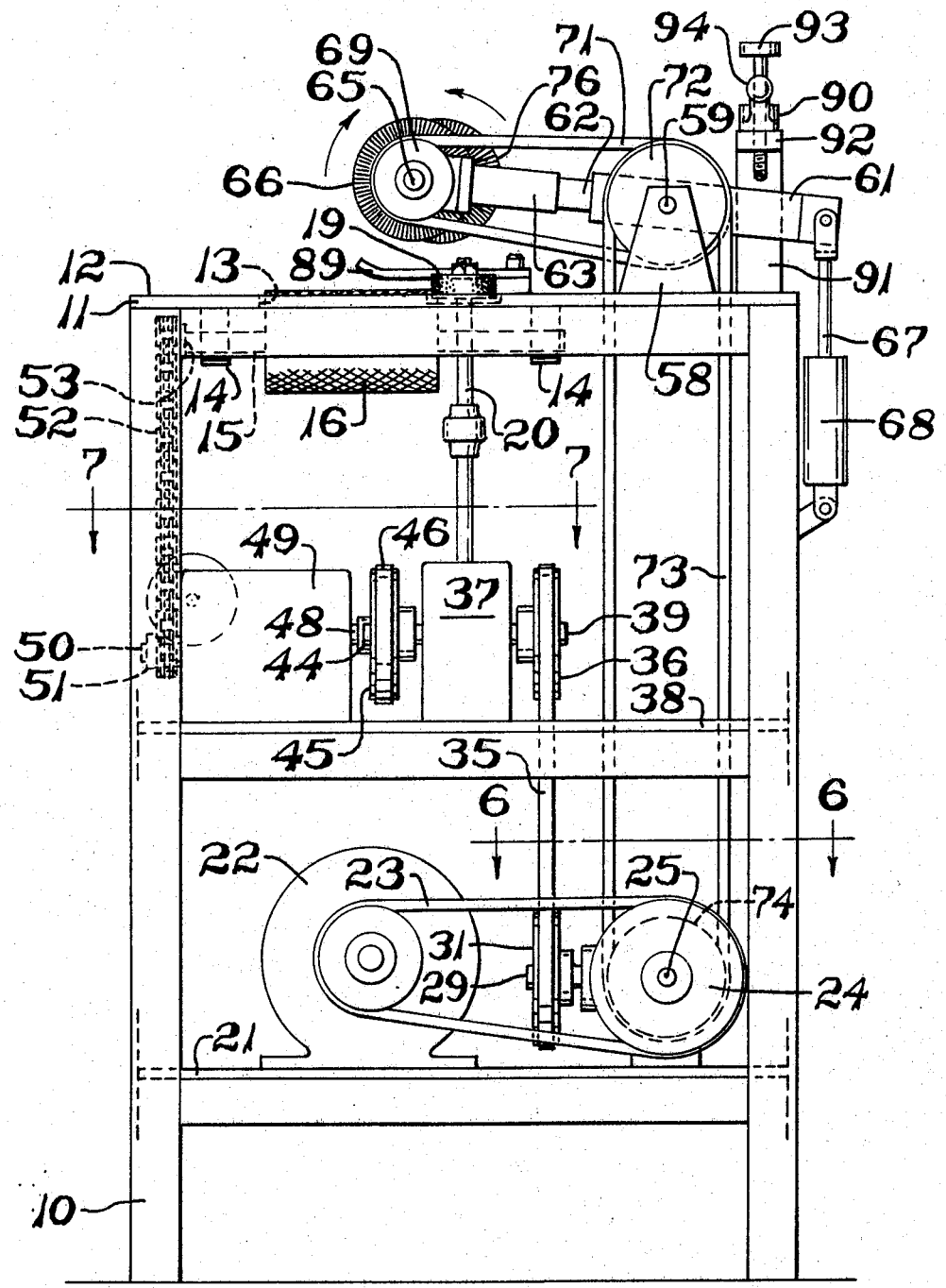
FIG. 1 is a side elevation view of a buffing apparatus.

Referring to the drawings wherein like reference characters designate like or corresponding parts throughout the several views, there is shown a frame 10 which supports the buffing apparatus. The upper portion of frame 10 supports a table or support means 11 having an upper working surface 12. The central portion of table 11 has an opening 13 extending therethrough, with the perimeter of such opening 13 forming a peripheral inner edge with the table. A pair of spaced brackets 14—14 are secured to the under surface of table or support 11 and said brackets 14—14 support a suitably journaled shaft 15 of a drive roll 16 which has its upper portion located within opening 13 to provide support for the outsole during the buffing operation. Drive roll 16 is cylindrical having a peripheral drive surface and a central axis 17 of rotation, which axis 17 is essentially parallel to upper surface 12 of table 11. The upper peripheral drive surface of roll 16 has its uppermost surface portions substantially tangential to the upper surface 12 of table 11 but slightly above the upper surface 12. Such difference in height between roll 16 and surface 12 provides partial support for the outsole. Drive roll 16 rotates about its central axis 17 and moves the outsole workpiece through a quasi-circular pattern in a horizontal plane above and adjacent upper surface 12 of table 11 while partially supported by drive roll 16 and partially supported by table 11. In the embodiment shown, drive roll 16 rotates clockwise about its central axis (as viewing FIG. 1 from the left).

Figure 5:
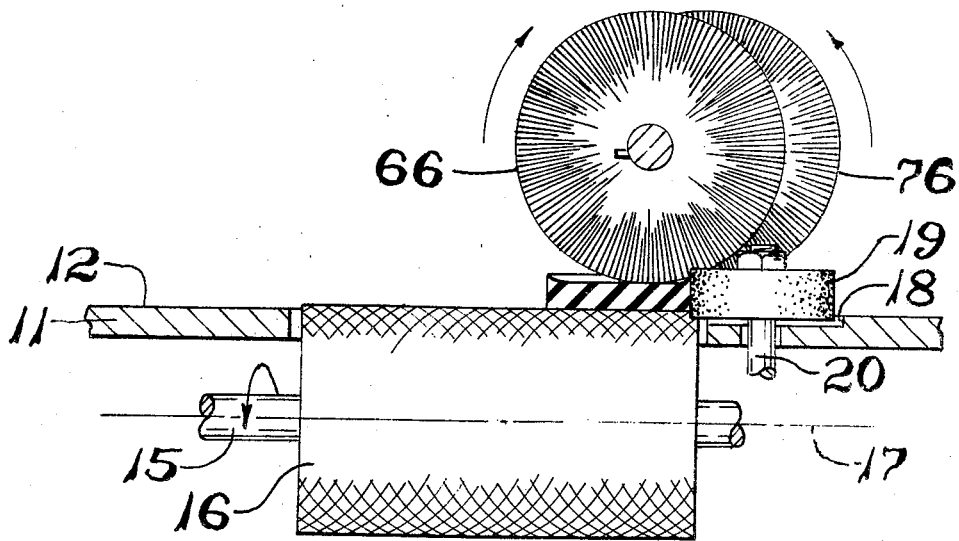
FIG. 5 is a fragmentary side elevation view of a portion of the table showing a plurality of brushing means, a lower drive roll and buffing stone operating on an outsole workpiece.

Table 11 is recessed as at 18 (FIG. 5) adjacent one edge portion of opening 13 to receive a buffing stone 19. Buffing stone 19 is suitably keyed to a vertically extending shaft 20 whose central axis of rotation is normal to the upper surface 12 of table 11. Buffing stone 19 engages the peripheral edge of the outsole and rotates at a tangential speed that is higher than the tangential speed of the peripheral surface of the outsole rotating in a quasi-circular pattern. The differential in tangential speeds of the buffing stone 19 and of the outsole effects the buffing action on the peripheral surface of the outsole workpiece.

The lower portion of frame 10 supports a platform 21 motor 25 drives a belt 23 which in turn drives pulley 24 secured to a transmission shaft 25. Shaft 25 provides an input to a transmission means 26 (FIG. 6) having a first bevel gear 27 which drives a second bevel gear 28 secured to a first output transmission shaft 29, which shaft 29 has a pulley 31 keyed thereto. The second bevel gear 28 meshes with a third bevel gear 32 within transmission means 26, which bevel gear 32 is keyed to a second output transmission shaft 33. A pulley 34 is secured to the second output shaft 33, which pulley 34 rotates in direction opposite to the rotational direction of pulley 24. First output shaft 29 and second output shaft 33 drive various components of the apparatus as hereinafter described.

As seen in FIG. 1, pulley 31 drives a V-belt 35 for transmitting power to a pulley 36 which pulley 36 is secured to a shaft 39 which is operatively connected to a second transmission means 37 mounted on a platform 38 secured to the intermediate portion of frame 10. As seen in FIG. 7, transmission means 37 comprises an input shaft 39 attached to a bevel gear 41 engaging a second bevel gear 42 for transmitting power to the vertically extending shaft 20, which shaft 20 is connected to buffing stone 19. Bevel gear 42 meshes with a bevel gear 43 in second transmission means 37 for transmitting power to an output shaft 44. A pulley 45 is secured to output shaft 44, which pulley 45 has a V-belt 46 interconnecting such pulley 45 to a pulley 47 secured to drive shaft 48, which shaft 48 provides an input drive to a variable speed transmission means 49. The output shaft 50 of variable transmission means 49 has a drive sprocket 51 keyed thereto for driving a chain 52. Chain 52 is connected to a sprocket 53 keyed to shaft 15 of drive roll 16. Accordingly, variable transmission means 49 provides a variable speed rotation to drive roll 16 in accordance with the setting preset by the operator.

Figure 2:
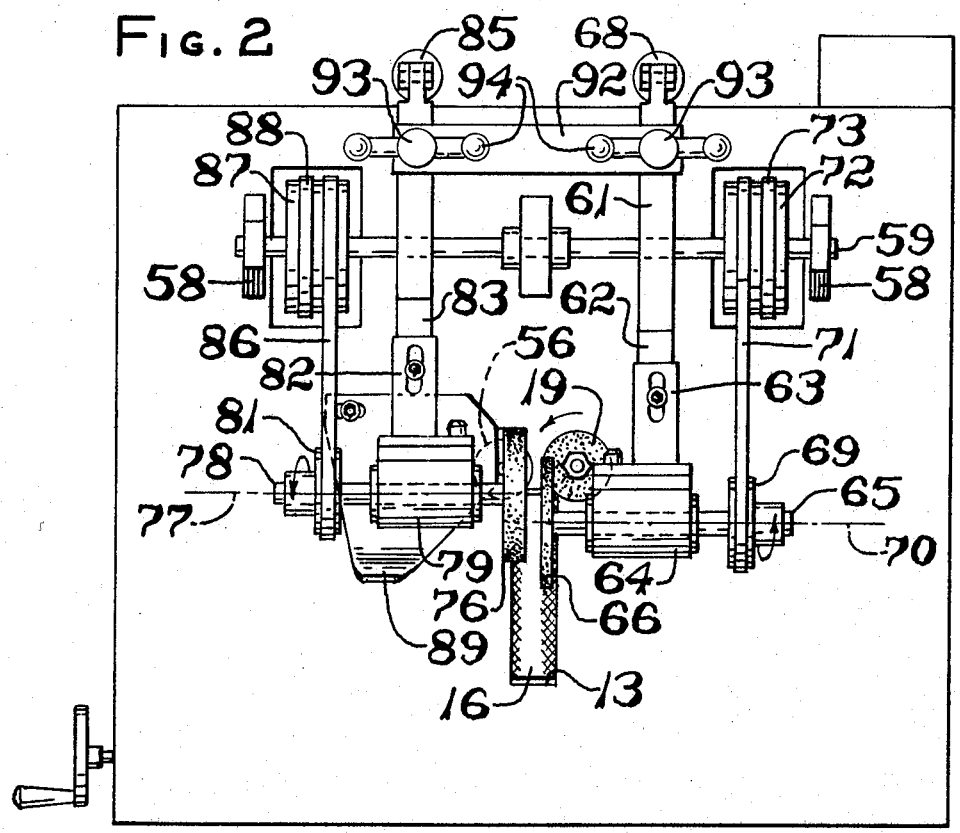
FIG. 2 is a plan view of the apparatus shown in FIG. 1.
Figure 3:
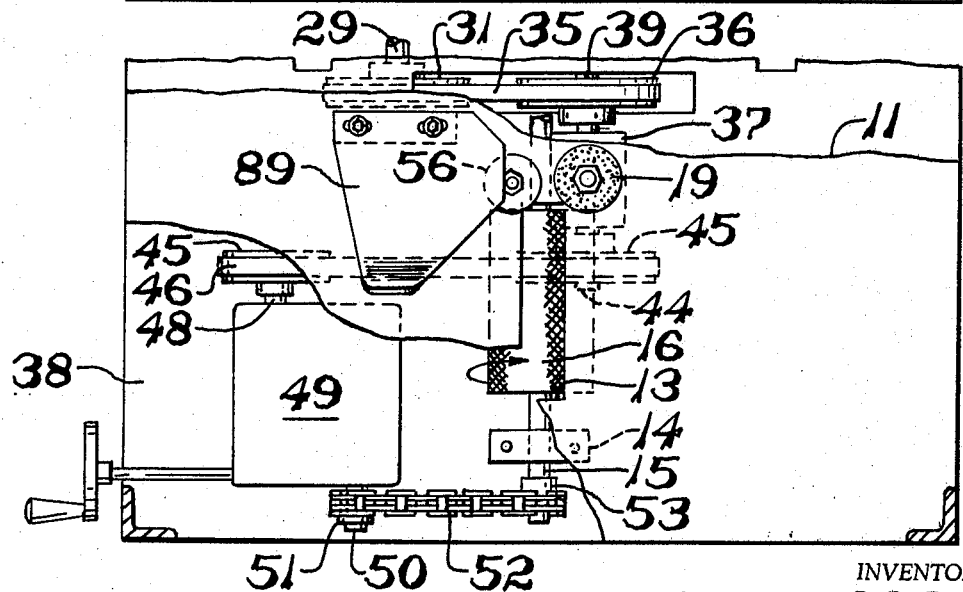
FIG. 3 is a fragmentary plan view of the apparatus with a portion broken away.
Figure 4:
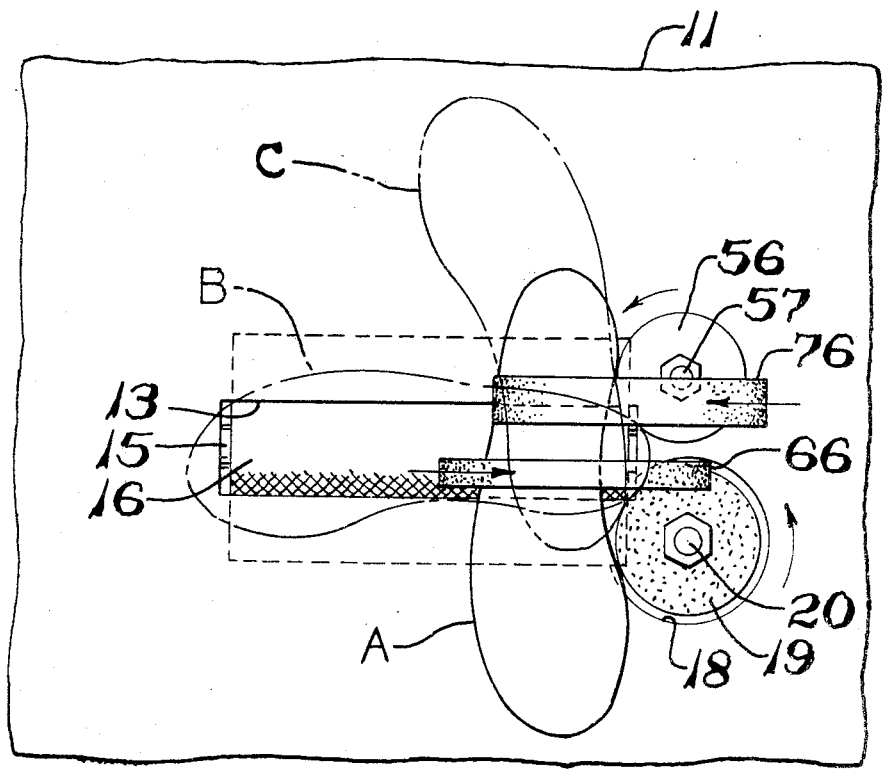
FIG. 4 is a simplified plan view which shows via phantom lines the intended sequence that the outsole workpiece passes through during the buffing operation.

To assist the movement of the outsole in the buffing operation, an idler guide roll 56 (FIGS. 2, 3, and 4) is journaled on a shaft 57 suitably secured to the table 11. Guide roll 56 is located adjacent one edge portion of opening 13 near the exposed surface of lower drive roll 16 and proximate to buffing stone 19. Guide roll 56 engages the peripheral surface of the outsole workpiece in a manner similar to buffing stone 19; however, guide roll 56 rotates freely during the buffing operation and cooperates with drive roll 16, buffing stone 19 and other components to drive the outsole through the quasi-circular sequence pattern of the buffing operation.

Attached to upper surface 12 of table 11 is a pair of spaced brackets or supports 58—58 having a pivot shaft 59 journaled thereon. Pivot shaft 59 provides a fulcrum for a support arm 61 which is operatively attached thereto approximately midway between its end portions. Support arm 61 has one end portion 62 extending into an adjustable sleeve 63, which sleeve 63 is secured to a bearing housing 64 having a rotatable shaft 65 journaled therein. A brushing means 66 is keyed to shaft 65 for rotation therewith about an axis 70 (FIG. 2), essentially parallel to upper surface 12 of table 11. Brushing means 66 comprises a circular brush whose outer brushing periphery is adapted to engage the upper surface of the outsole during the buffing operation. The other end of support arm 61 is pivotally connected to a piston rod 67 (FIG. 1) of pneumatic cylinder 68, which cylinder 68 is pivotally secured to the frame 10. Upon pressurization of the head end of pneumatic cylinder 68, piston rod 67 is extended or moved upwardly as viewed in FIG. 1 pivoting support arm 61 in a counterclockwise direction as viewed in FIG. 1 about pivot shaft 59. Such downward pivoting action of brushing means 66 is in cooperation with the rotation of the brushing means to provide a scuffing action on the upper surface of the outsole workpiece.

Rotation of brushing means 66 is effected through a pulley 69 (FIGS. 1 and 2), which pulley 69 is keyed to shaft 65. A drive belt 71 connects pulley 69 with a double pulley 72 wherein a V-belt 73 interconnects pulley 72 with a pulley 74 that is keyed to drive shaft 25 (FIG. 6), which shaft 25 is driven by motor 22 via belt 23 as described hereinbefore. The preferred direction of rotation of brushing means 66 is clockwise rotation as viewed in FIG. 1 about its central axis 70.

A second brushing means 76 is provided for scuffing the upper surface of the outsole workpiece. A shaft 78 journaled in bearing housing 79 has the second brushing means 76 keyed to one end thereof and a drive pulley 81 secured to the other end portion thereof. Bearing housing 79 is secured to a sleeve 82 which receives one end of an elongated second support arm 83 which arm 83 is identical in construction to support arm 61 (FIG. 1). The other end of support arm 83 is pivotally connected to a piston rod of a second pneumatic cylinder 85. Pneumatic cylinder 85 is pivotally secured to frame 10. Pressurization of the head end of cylinder 85 pivots the brushing means 76 counterclockwsie about shaft 59 whereas pressurization of the rod end of cylinder 85 pivots brushing means 76 clockwise about shaft 59 as viewed in FIG. 1.

Rotation of second brushing means 76 about its axis 77 is effected by a drive belt 86 engaging pulley 81 and further operatively interconnected to a double pulley 87. Double pulley 87 is driven via a belt 88 which is connected to a pulley 34 and shaft 33 (FIG. 6) as hereinbefore described.

Second brushing means 76 is rotated about its axis 77 independent of first brushing means 66. Preferably, second brushing means is rotated in a counter-clockwise direction (as viewed in FIG. 1) about its axis 77 which rotation is counter to the rotation of first brushing means 66. The second brushing means 76 has an axis of rotation 77 that is parallel to the upper surface 12 of table 11 and also parallel to the axis 70 of shaft 65; however, axis 77 is laterally off-set relative to axis 70 of first brushing means 66. The counter-rotation of first brushing means 66 to second brushing means 76 in conjunction with the off-setting rotational axes 70 and 77 thereof, drive the outsole workpiece through a horizontal quasi-circular pattern during the buffing operation.

A hold-down plate 89 is secured to upper surface 12 of table 11 adjacent opening 13 in table 11 for further aiding and guiding the outsole during the buffing operation.

An adjusting stop means device 90, having an upwardly extending bracket portion 91 with a horizontally extending flange 92 on the upper end thereof, is mounted on the rearwardly disposed portion of table 11. The respective end portions of flange 92 have threaded bores which receive threaded bolts 93—93 whose lower portion is adopted to limit the counterclockwise (as viewed in FIG. 1) movement of the brushing means 66–76 towards the outsole workpiece located on drive roll 16. A threaded boss with laterally extending knob handles 94—94 is threaded onto bolts 93—93 to insure locking of the bolts 93—93 in their adjusted position on flanges 92.

Having described the preferred embodiment, the best mode of carrying out this invention is hereinafter described. The buffing means 66, 76 for scuffing the upper surface of outsoles are pivoted in a clockwise direction as viewed in FIG. 1 by the pressurization of the head end of pneumatic cylinders 68 and 85 to thereby raise such buffing means to provide clearance space for the placing of an outsole workpiece on the lower drive roll 16. The outsole workpiece is placed in position A (FIG. 4) wherein the outsole is partially supported by lower drive roll 16 and partially supported by the table 11. Simultaneously with the energization of motor 22, cylinders 68 and 85 are pressurized to pivot the buffing means 66 and 76 counterclockwise as viewed in FIG. 1 about shaft 59 to lower the buffing means 66 and 76 into abutting engagement with the outsole which is supported by the lower drive roll 16. Due to the counter-rotation of buffing means 66, 76 and the interaction thereof with the lower drive roll 16, the outsole workpiece is drawn into the center of the work area. The outsole workpiece moves into abutting engagement with the edge of buffing stone 19 and the edge guide roll 56. The interaction of buffing means 66, 76, which rotate in different directions with offsetting axes, and the rotation of lower guide roll 16 cooperating with buffing stone 19 and the rotation of guide roll 56 provides a rotation to the outsole workpiece which moves it in a quasi-circular pattern (FIG. 4) from position A, to position B, to position C while buffing the peripheral and entire upper surface of the outsole.

The coordination and interaction of all the various components hereinbefore described move the outsole workpiece in a continuous quasi-circular pattern engaging brushing means 66 and 76 which buff the upper surface while simultaneously engaging buffing stone 19 which buffs the peripheral surface, thereby enabling the top and side surfaces to be simultaneously buffed. A single and continuous manufacturing operation is achieved substantially increasing commercial production rates. With such action uniformly scuffed outsoles are produced providing a surface which can be effectively bonded to other surfaces to thereby produce structurally sound footwear products.

Although a specific embodiment and a preferred mode of operation of the invention has hereinbefore been described, it is understood that the subject invention is not limited thereto. All obvious variations and modifications thereof are contemplated and included within the spirit and scope of this invention as defined in the appended claims.

I claim:

1. A buffing apparatus for scuffing the upper end peripheral surfaces of a molded outsole, comprising: a support means; a drive roll mounted on said support means having its upper portion tangential to the upper surface of said support means; said drive roll cooperative with a portion of said support means to define a work area; a buffing stone mounted on said support means adjacent said drive roll for buffing the peripheral edge of an outsole in said work area; an idler roller mounted on said support means closely adjacent said buffing stone and cooperative therewith to guide the peripheral edge of an outsole in a quasi-circular path; a pair of rotatable brushing means mounted on said support means; means operatively connected to said brushing means for moving said brushing means toward and away from said drive roll; motive drive means mounted on said support means operatively connected to said buffing stone, idler roll, drive roll and brushing means to provide rotation thereto; and transmission means operatively interconnecting said motive drive means to said pair of brushing means to impart opposite rotation thereto.

2. A buffing apparatus as set forth in claim 1 wherein the axes of rotation of said brushing means are offset relative to each other and parallel to each other and parallel to the surface of said working area.

3. A buffing apparatus as set forth in claim 2 wherein said support has adjustable stop means mounted thereon for limiting the movement of said brushing means toward said drive roll.

4. A buffing apparatus as set forth in claim 3 wherein said axes of said buffing stone and said idler roller are normal to said surface of said work area; and the axis of said drive roll being parallel to said surface of said work area; and a hold-down plate mounted closely adjacent said drive roll and spaced therefrom to facilitate the movement of an outsole into said work area.

5. A buffing apparatus for scuffing upper and peripheral surfaces of molded outsoles, which comprises: a support means having an upper planar surface; an opening extending through said support means with the pheriphery of said opening defining an inner edge; lower rotatable drive means operatively mounted to said support means having a portion thereof located within the opening of said support means for supporting an outsole; said lower rotatable drive means having a central axis of rotation below the upper surface of said support means and parallel to said upper surface; means operatively attached to said lower drive roll for rotating said lower drive roll about its central axis of rotation; a rotatable buffing stone secured to said support means having a central axis of rotation normal to said upper planar surface of said support means; said buffing stone disposed adjacent said upper surface of said support means and proximate to the inner edge of the opening in said support means and operative for scuffing the peripheral surfaces of an outsole; means operatively attached to said buffing stone for rotating said buffing stone about its central axis; rotatable brushing means disposed above the upper surface of said support means having a central axis of rotation substantially parallel to the upper surface of said support means and a brushing periphery for scuffing the upper surface of the outsole; said brushing means operatively attached to said support means for movement toward and away from the upper surface of said support means; power operated means mounted on said support means and connected to said brushing means for moving said brushing means toward and away from said upper planar surface; and means operatively attached to said brushing means for rotating said brushing means about its central axis.

6. The apparatus of claim 5 having a second brushing means disposed above the upper surface of said support means having a central axis of rotation substantially parallel to the upper surface of said support means and a brushing periphery for scuffing the upper surface of the outsole; said second brushing means operatively attached to said support means for movement; power operated means mounted on said support means and connected to said second brushing means for moving said second brushing means toward and away from the upper surface of said support means; and means operatively attached to said brushing means for rotating said brushing means about its central axis.

7. The buffing apparatus of claim 6 having a first support arm operatively attached to said first brushing means and pivotally mounted to said support means for movement toward and away from the upper surface of said support means; and a second support arm operatively attached to said brushing means and pivotally mounted to said support means for movement toward and away from the upper surface of said support means.

8. The buffing apparatus of claim 6 wherein said central axis of rotation of said first brushing means is laterally offset from said axis of rotation of said second brushing means; and said means for rotating said brushing means rotates said first brushing means in a clockwise direction about its central axis of rotation and said second brushing means in a counterclockwise direction about its central axis of rotation.

9. The buffing apparatus of claim 8 wherein said lower drive roll rotates clockwise about its central axis with its upper peripheral surface traveling in a tangential direction that is normal to the lower tangential direction of rotation of said first brushing means.

10. The buffing apparatus of claim 9 including a freely rotatable guide roll having a central axis of rotation normal to the upper surface of said support means; said guide roll disposed adjacent the upper surface of said support means and proximate to the inner edge of the opening in said support means and operative to guide the outsole; and a holding plate secured to the upper surface of said support means and partially disposed over the opening in said support means for holding down the outsole during the buffing operation.

References Cited
UNITED STATES PATENTS

| | | | |
|---|---|---|---|
| 2,130,553 | 9/1938 | Le Gault | 69—6.5 |
| 3,064,460 | 11/1962 | Dziadulonis | 12—17 X |
| 3,174,170 | 3/1965 | Verreaolt et al. | 69—6.5 X |

PATRICK D. LAWSON, Primary Examiner

U.S. Cl. X.R.

69—6.5

UNITED STATES PATENT OFFICE
CERTIFICATE OF CORRECTION

Patent No. 3,508,289                          April 28, 1970

Arthur W. Joyce

It is certified that error appears in the above identified patent and that said Letters Patent are hereby corrected as shown below:

Column 1, line 35, "in" should read -- is --. Column 3, line 19, after the numeral "21" insert -- on which is mounted a drive motor 22. The output of --. Column 6, line 15, "pheriphery" should read -- periphery --.

Signed and sealed this 15th day of September 1970.

(SEAL)
Attest:

Edward M. Fletcher, Jr.                       WILLIAM E. SCHUYLER, JR.
Attesting Officer                                   Commissioner of Patents